(12) United States Patent
Dellian

(10) Patent No.: US 8,277,088 B2
(45) Date of Patent: Oct. 2, 2012

(54) OPTICAL ELEMENT

(75) Inventor: Harald Dellian, Edling (DE)

(73) Assignee: Osram AG, Munich (DE)

(*) Notice: Subject to any disclaimer, the term of this patent is extended or adjusted under 35 U.S.C. 154(b) by 524 days.

(21) Appl. No.: 12/502,316

(22) Filed: Jul. 14, 2009

(65) Prior Publication Data

US 2010/0014292 A1    Jan. 21, 2010

(30) Foreign Application Priority Data

Jul. 17, 2008    (DE) .................... 10 2008 033 543

(51) Int. Cl.
*F21V 17/02* (2006.01)

(52) U.S. Cl. .................... 362/319; 362/278; 359/224.1; 359/846

(58) Field of Classification Search ............ 359/224.1, 359/359, 846, 847, 849; 362/277, 278, 319, 362/320, 352

See application file for complete search history.

(56) References Cited

U.S. PATENT DOCUMENTS

| | | | | |
|---|---|---|---|---|
| 4,243,301 A | * | 1/1981 | Powell | 359/847 |
| 5,497,274 A | * | 3/1996 | Soll et al. | 359/846 |
| 5,677,800 A | * | 10/1997 | Soll et al. | 359/846 |
| 7,780,300 B2 | * | 8/2010 | Falk | 359/849 |

* cited by examiner

*Primary Examiner* — Thomas Sember

(57) ABSTRACT

In various embodiments, an optical element may include at least one elastically deformable support, on which at least one reflective layer is applied; and in addition at least one deformation apparatus for elastically deforming the at least one support.

15 Claims, 4 Drawing Sheets

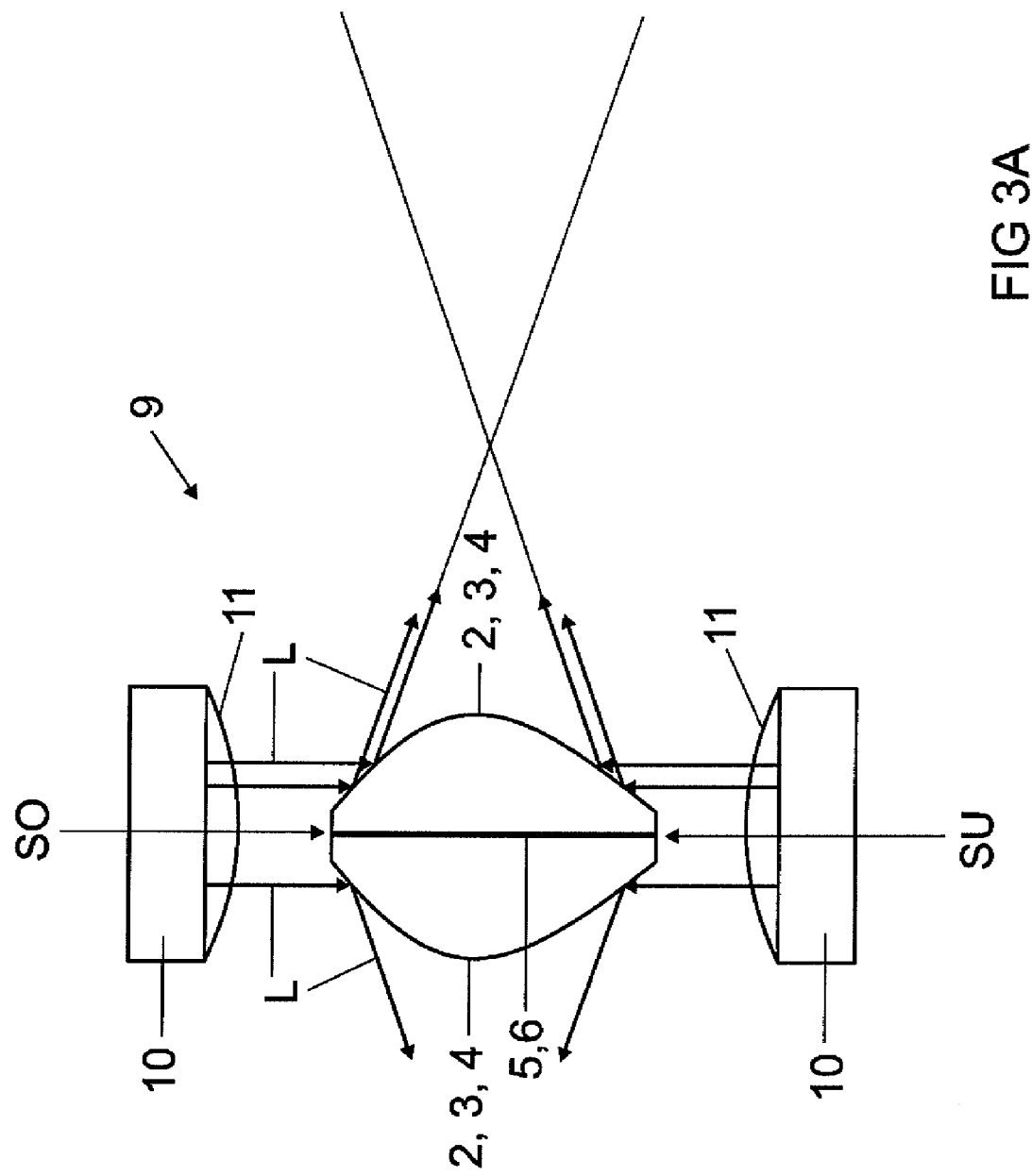

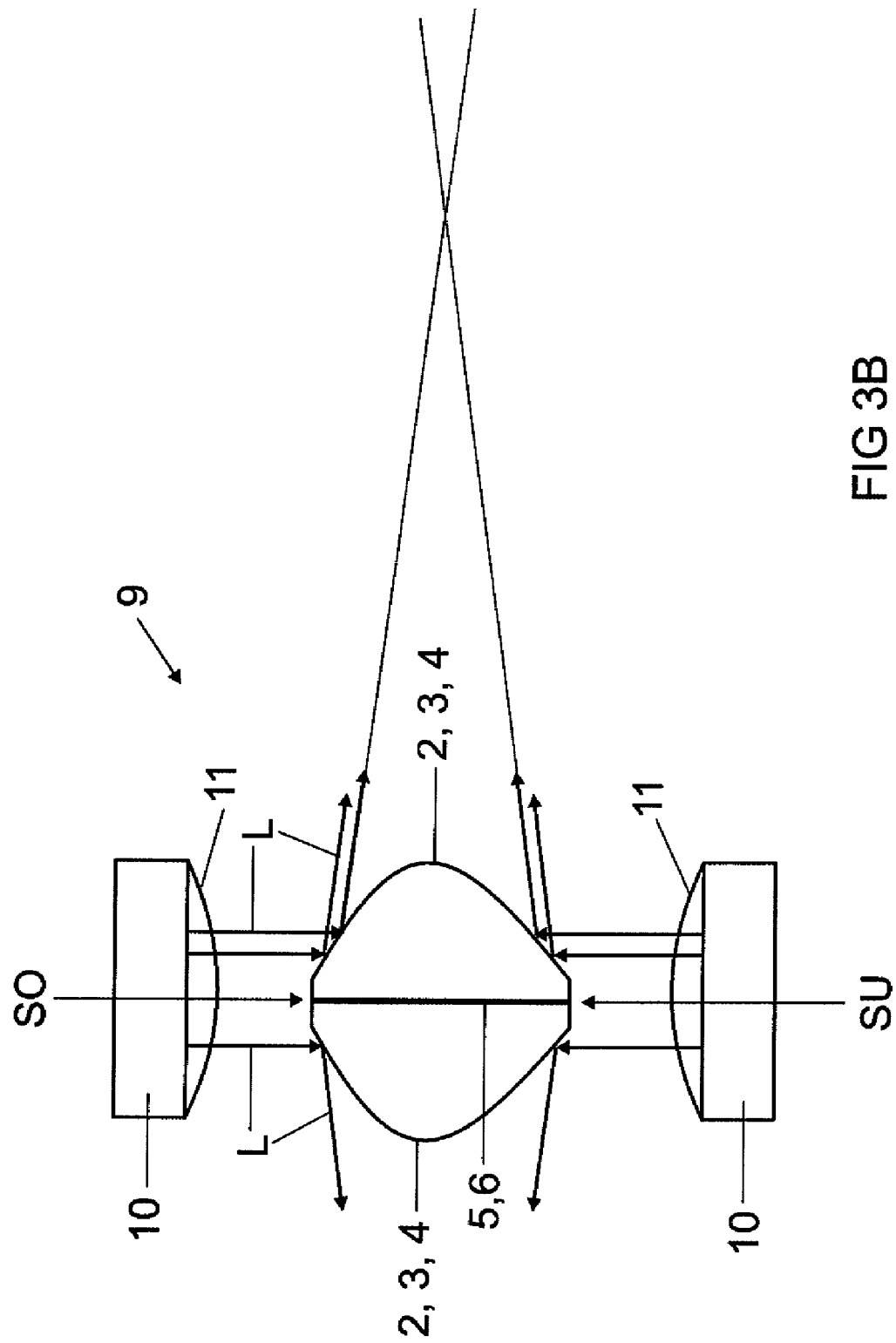

OPTICAL ELEMENT

RELATED APPLICATIONS

The present application claims priority from German application No.: 10 2008 033 543.6 filed on Jul. 17, 2008.

TECHNICAL FIELD

Various embodiments relate to an optical element and to a light-emitting apparatus with at least one such optical element.

BACKGROUND

In the case of light sources with a narrow emission angle such as light-emitting diodes, a distribution of the light emitted by said light sources is often required. For this purpose, until now rigid optical units made from polymers in the form of hemispheres or in conical form have been known.

SUMMARY

In various embodiments, an optical element includes at least one elastically deformable support, on which at least one reflective layer is applied, and at least one deformation apparatus for elastically deforming the at least one support.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3A shows a sketch of a light-emitting apparatus with an optical element which has not been deformed or has only been slightly deformed; and FIG. 3B shows a sketch of a light-emitting apparatus with an optical element which has been deformed to a greater extent than in FIG. 3A.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The word "exemplary" is used herein to mean "serving as an example, instance, or illustration". Any embodiment or design described herein as "exemplary" is not necessarily to be construed as preferred or advantageous over other embodiments or designs.

Figure 1:
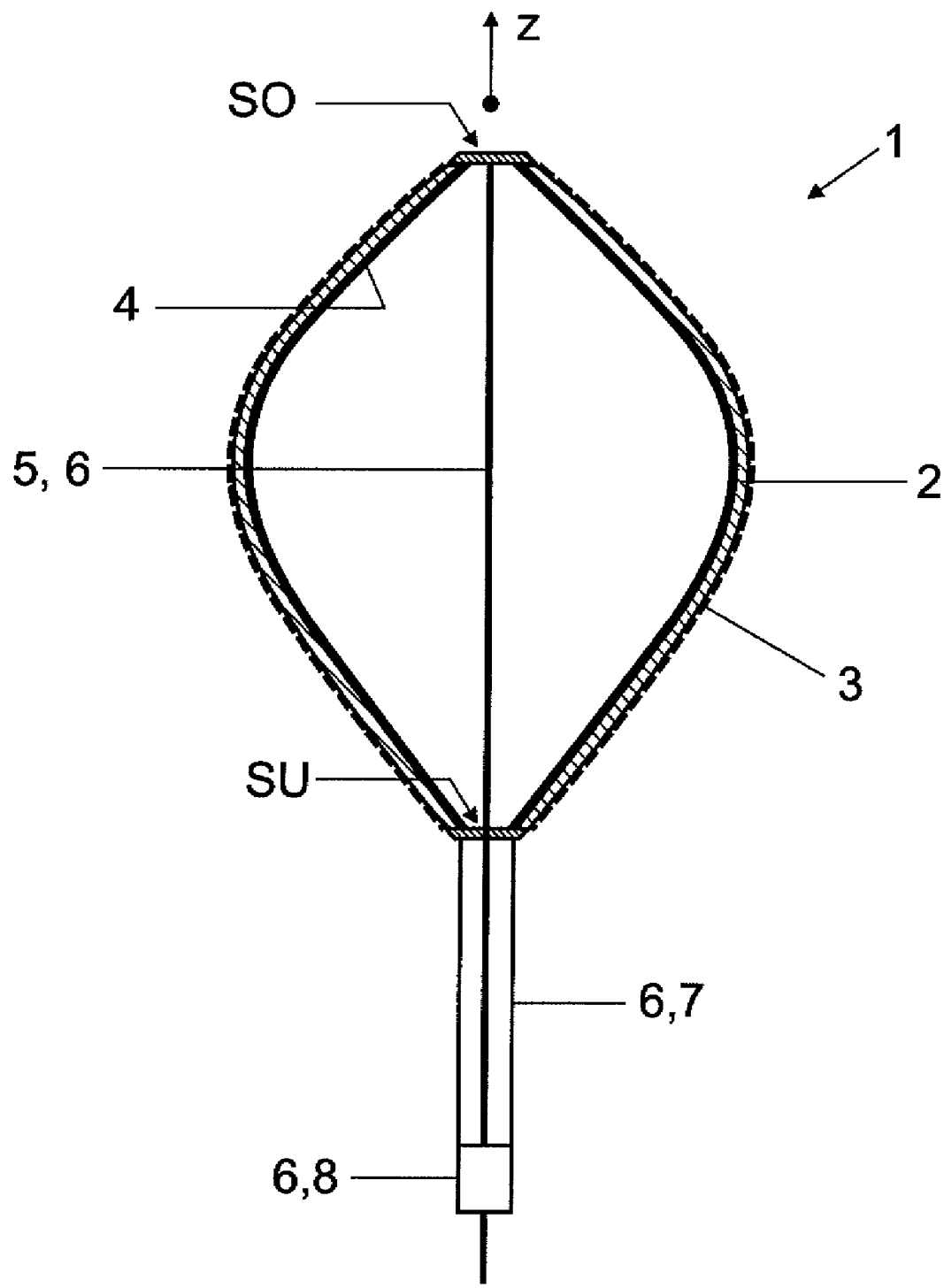
FIG. 1 shows a sketch, as a sectional illustration in a side view, of an optical element.

FIG. 1 shows an optical element 1 with an elastically deformable (flexible), shell-shaped supporting structure 2 made from polymer which has been constructed in angularly symmetrical fashion about the longitudinal axis (z axis) and on whose outer side a reflective layer 3 has been applied. The supporting structure 2 is additionally provided with elastic struts in the form of supporting bending wires 4, said bending wires 4 having been cast in the polymer material of the supporting structure 2. A tension wire 5 is connected undetachably to the supporting structure 2 at the upper apex SO of the supporting structure 2 by virtue of the fact that it is cast with its end in the polymer. A deformation apparatus for elastically deforming the supporting structure 2 in the form of a tensioning apparatus 6 for optionally tensioning the tension wire 5 and relieving said tension wire of tension is positioned at the lower apex SU of the supporting structure 2, which apex SU is opposite the upper apex SO. For this purpose, the tension wire 5 reaches through a sleeve 7 in the tensioning apparatus 6 to a thread 8, on which the tension wire 5 is fitted firmly. By rotating the thread 8, for example by means of an electric motor (not illustrated here) or even manually, the tension wire 5 is displaced with respect to the sleeve 7 optionally in both directions and therefore moved out and in. Since the sleeve 7 rests firmly on the supporting structure 2, the section of the tension wire 5 between the upper apex SO and the lower apex SU is correspondingly shortened (tensioned) or lengthened (relieved of tension). Then, the supporting structure 2 is curved to a greater or lesser extent. As a result, firstly a geometrical emission characteristic of the reflective layer 3 resting on the supporting structure 2 and secondly a refractive index of the reflective layer(s) 3 which is dependent on the angle of incidence can be set. This results in the advantages that a refractive power can be set over a wide range, and the rate of deformation can be very rapid. The reflective layers have losses since not all of the light is reflected, but a small proportion, depending on the refractive index, is coupled into the layer, inter alia.

Figure 2:
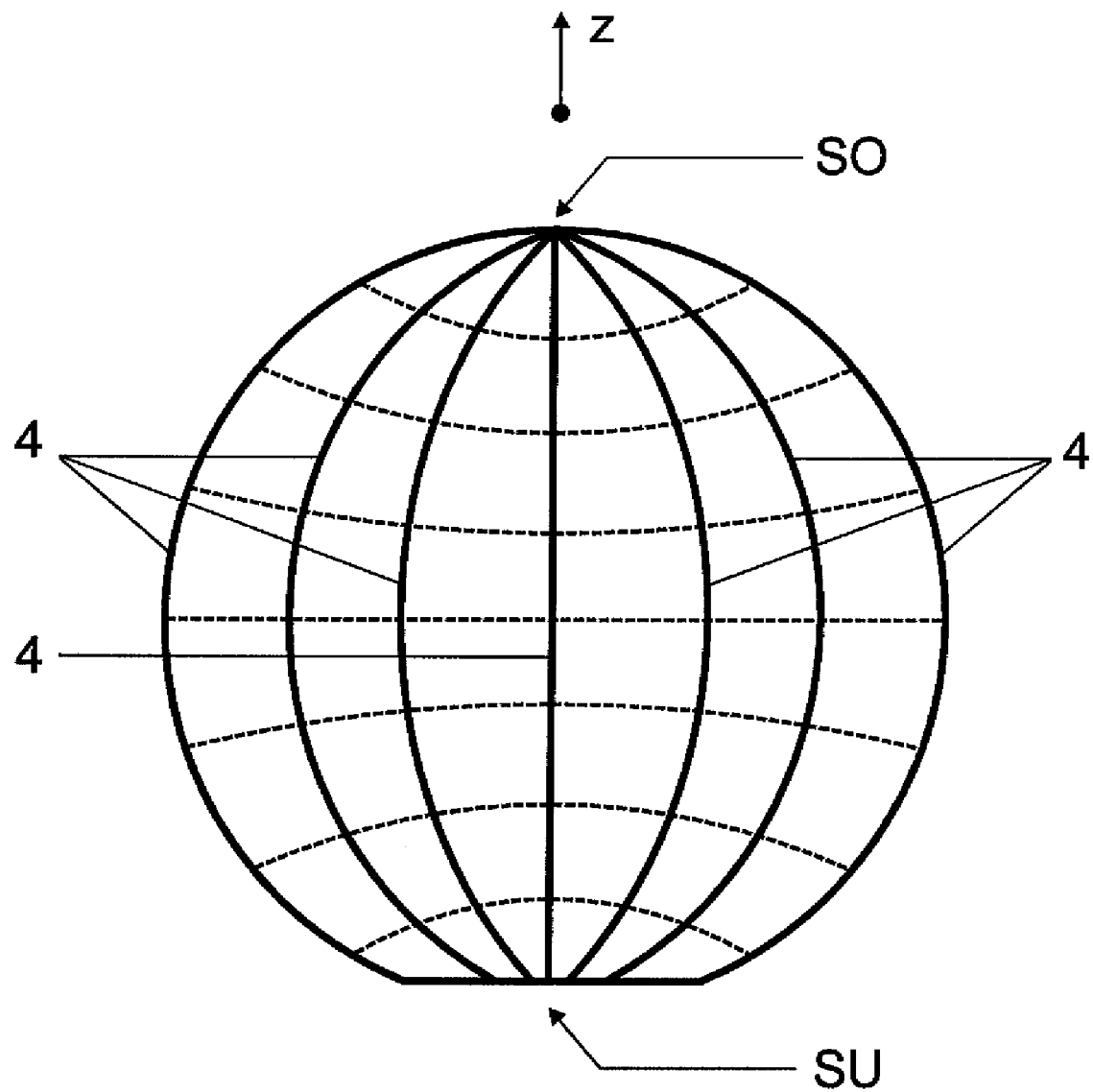
FIG. 2 shows a view from the front of an arrangement of bending wires of the optical element from FIG. 1.

As is shown in more detail in FIG. 2, the supporting structure 2 has a plurality of bending wires 4, which extend in a vertical plane and are distributed in the circumferential direction uniformly about the tension wire, i.e. with the same angular interval about the axis of the tension wire (z axis). In addition or as an alternative, however, approximately horizontal bending wires can, for example, also be fitted in the supporting structure 2, as is illustrated by dashed lines here, or else bending wires which are spaced apart at an angle about a normal with respect to the perpendicular. As a result of the bending wires, the supporting structure, which is very flexible for rapid switching, is stabilized and possibly tensioned areally.

In a further embodiment, the supporting structure is produced from a rubber material, for example from rubber (vulcanized rubber).

FIG. 3A shows a sketch of a light-emitting apparatus 9 with an optical element 1 from FIG. 1 which has not been deformed or has only been slightly deformed. In each case one light-emitting diode 10, which is directed vertically (along the z direction) onto the optical element 1, is positioned opposite the apexes SO and SU of the optical element 1. Each of the LEDs 10 is equipped with an optical unit 11, for example a lens, in order to direct the light L emitted from the LED 10 onto the optical element 1 or the reflective layer(s) 43 thereof, from where it is emitted laterally at an emission angle which is dependent on the position of incidence of the reflective layer 43, as is illustrated schematically by dashed lines. In the case of the light-emitting apparatus 9 shown with the two light sources, a transparent tension wire 5 is preferred since said wire then does not impede the inward radiation of light by the light source positioned directly opposite said tension wire.

FIG. 3B shows a sketch of a light-emitting apparatus 9 with an optical element 1 which has been deformed to a greater extent than in FIG. 3A. As a result of the tensioning or tightening of the tension wire 5, the supporting structure 2 with the reflective layer 3 is shortened (upset) in the longitudinal direction (z direction), as a result of which the curvature is increased. As a result, the light beams L from the LEDs 10 impinge upon the reflective surface 3 at a different angle than in FIG. 3A, as a result of which, firstly, the lateral emission angle is altered, and the refractive index of the reflective layers is also altered, in accordance with Snell's law of refraction. As a result, the emission characteristic of the optical element 1 is altered.

The present invention is naturally not restricted to the exemplary embodiments shown.

For example, the tension wire can also be moved by means of an electromechanical servodrive or by means of a piezoelectric actuator.

In the event of a sufficient strength of the supporting structure, it is also possible to dispense with the bending wires.

The tension wire can also be made from metal, for example in the form of a metal cable, whose individual wires act symmetrically on the upper end about the upper apex.

Instead of a wire, a bar can also be used, for example one made from Plexiglas.

Instead of a tensile element, a tensile/compression element can also be used, for example a bar which can both compress and extend the supporting structure and the support with the application of force.

A further deformation apparatus could, for example, supply compressed air to an air-tight support or allow compressed air to escape from said support.

Various embodiments provide a possibility of a light distribution which can be varied, e.g. over a wide range and in addition rapidly.

In various embodiments, an optical element has at least one elastically deformable support, on which at least one reflective layer is applied. The optical element also has at least one deformation apparatus for elastically deforming the at least one support. By actuation of the deformation apparatus, the degree of deformation of the support and therefore of the reflective layer(s) applied thereto can thus be set. As a result, the emission characteristic can in turn be altered significantly and rapidly.

An optical element may be provided in which the support has a flat supporting structure, on which the at least one reflective layer is applied. The flat supporting structure may have planar (plate-shaped) regions and/or curved (shell-shaped) regions.

The supporting structure may be self-supporting. However, it is advantageous for particularly rapid deformation with comparatively low forces being applied if the supporting structure is very easily deformable or even non-self-supporting. Examples of a non-self-supporting supporting structure are a woven fabric, a thin film or a rubber layer. In this case it is advantageous for ensuring dimensional stability if the flat supporting structure is provided with elastic struts.

It may be advantageous for a simple design if the elastic struts are in the form of bent wires, in particular if they are subject to bending stress. These bent wires can be, for example, adhesively bonded, cast (in the case of polymer), woven, vulcanized etc. into the supporting structure.

For easy and therefore rapid deformability, an optical element is alternatively provided in the case of which the support has a support layer, which is provided with the at least one reflective layer and which is made from a (natural or synthetic) rubber material, for example rubber.

The deformation apparatus may have at least one tensile element, which acts on the support, in particular the supporting structure of the support, and at least one tensioning apparatus, which is fastened on the support, e.g. so as to rest thereon, for optionally tensioning the supporting structure and relieving said supporting structure of tension and therefore targeted (greater and lesser) deformation of the supporting structure.

For the large-area deformation of the support, it may be provided that the tensile element acts on an edge of the support, which edge is opposite the fastening region with the tensioning apparatus. Tensioning and tension relief or shortening and lengthening can therefore be applied over a large width of the optical element.

In various embodiments, the tensile element may include at least one tension wire, e.g. in the case of arrangement in a viewing range or in an optical beam path e.g. made from a transparent material, specifically a polymer, e.g. nylon. However, a non-transparent tension wire can also be used, for example one made from metal.

In order to tension the tensile element and relieve said tensile element of tension in a simple manner, it may be provided that the at least one tensile element is fastened on a thread of the tensioning apparatus and is capable of moving longitudinally with said tensioning apparatus.

Alternatively, the tensioning apparatus can have a clamping apparatus for optionally holding and releasing the at least one tensile element, for example in the form of a quick-action spanner.

However, the tensile element can also be moved by means of another drive, for example by means of an electromotive servomotor, a piezoelectric-actuator linear drive, a driven roller etc.

The optical element can also be equipped with two or more elastically deformable supports and with a deformation apparatus for jointly deforming the supports.

It may be advantageous for converting the deformation into a considerable change in the emission characteristic if the reflective layer(s) is/are spherical or conical.

The light-emitting apparatus may be equipped with at least one optical element and at least one light source directed towards the at least one optical element, for example with two mutually opposite light sources.

In various embodiments, the light source may include at least one light-emitting diode. The light source may be present, for example, in the form of an LED module with a light-emitting diode chip or a plurality of light-emitting diode chips. The individual light-emitting diodes or light-emitting diode chips can in each case emit monochromatic or heterochromatic, for example white, light. It is thus possible for an LED module to have a plurality of individual LED chips ("LED clusters"), which together can result in a white mixed light, for example "cold white" or "warm white". In order to produce a white mixed light, the LED cluster may include light-emitting diodes which illuminate in the primary colors red (R), green (G) and blue (B). In this case, individual or a plurality of colors can also be produced simultaneously by a plurality of LEDs; combinations RGB, RRGB, RGGB, RGBB, RGGBB etc. are therefore possible. However, the color combination is not restricted to R, G and B. In order to produce a warm-white hue, one or more amber-colored LEDs (A) can also be provided, for example. In the case of LEDs with different colors, said LEDs can also be driven in such a way that the LED module emits in a variable RGB color range. In order to produce a white light from a mixture of blue light with yellow light, blue LED chips provided with phosphor can also be used, for example using surface-mounting technology, for example using Thin-GaN-technology. In this case, an LED module can also have a plurality of white individual chips, as a result of which it is possible to achieve simple sealability of the luminous flux. The individual chips and/or the modules can be equipped with suitable optical units for beam guidance, for example Fresnel lenses, collimators etc. It is possible for a plurality of identical or different LED modules to be arranged at one contact, for example a plurality of identical LED modules on the same substrate. Instead of or in addition to inorganic light-emitting diodes, for example on the basis of InGaN or AlInGaP, it is generally also possible to use organic LEDs (OLEDs). Diode lasers can also be used, for example.

LIST OF REFERENCE SYMBOLS

1 Optical element
2 Supporting structure
3 Reflective layer(s)
4 Bending wire
5 Tension wire
6 Tensioning apparatus
7 Sleeve
8 Thread
9 Light-emitting apparatus
10 Light-emitting diode
11 Lens
L Light beam
SO Upper apex
SU Lower apex While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An optical element, comprising:
   at least one elastically deformable spherical or conical support, on which at least one reflective layer is applied; and
   at least one deformation apparatus for elastically deforming the at least one support;
   wherein the support extends from an apex in an angularly symmetric fashion around an axis through the apex; and
   wherein the deformation apparatus is configured to symmetrically deform the spherical or conical support around said axis.

2. The optical element as claimed in claim 1,
   wherein the supporting structure is provided with elastic struts.

3. The optical element as claimed in claim 2,
   wherein the elastic struts are in the form of bent wires.

4. The optical element as clamed in claim 3,
   wherein the bent wires are subject to bending stress.

5. The optical element as claimed in claim 1,
   wherein the support has a support layer, which is provided with the at least one reflective layer and which is made from a rubber material.

6. The optical element as claimed in claim 1,
   wherein the deformation apparatus comprises:
      at least one tensile element acting on the support; and
      a tensioning apparatus fastened on the support for optionally tensioning the tensile element and relieving said tensile element of tension.

7. The optical element as claimed in claim 6,
   wherein the tensile element acts on an edge of the support, which edge is opposite the fastening region of the tensioning apparatus.

8. The optical element as claimed in claim 6,
   wherein the tensile element comprises at least one tension wire or tension bar.

9. The optical element as claimed in claim 6,
   wherein the at least one tensile element is fastened on a thread of the tensioning apparatus.

10. The optical element as claimed in claim 6,
    wherein the tensile element is made from a transparent polymer.

11. The optical element as claimed in claim 10,
    wherein the tensile element is made from nylon.

12. The optical element as claimed in claim 6,
    wherein the tensioning apparatus has a clamping apparatus for optionally holding and releasing the at least one tensile element.

13. The optical element as claimed in claim 1, further comprising:
    at least two elastically deformable supports; and
    a deformation apparatus for jointly deforming the supports.

14. The optical element as claimed in claim 13,
    wherein the reflective layer of the at least one support is spherical.

15. The optical element as claimed in claim 13,
    wherein the reflective layer of the at least one support is conical.

* * * * *